(12) United States Patent
Matsumoto et al.

(10) Patent No.: US 7,139,464 B2
(45) Date of Patent: Nov. 21, 2006

(54) SURFACE LIGHT SOURCE AND LIGHT GUIDE USED THEREFOR

(75) Inventors: Hiroki Matsumoto, Kanagawa (JP); Tomoyoshi Yamashita, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 10/524,413

(22) PCT Filed: Aug. 15, 2003

(86) PCT No.: PCT/JP03/10372

§ 371 (c)(1),
(2), (4) Date: Feb. 14, 2005

(87) PCT Pub. No.: WO2004/016985

PCT Pub. Date: Feb. 26, 2004

(65) Prior Publication Data

US 2005/0237768 A1    Oct. 27, 2005

(30) Foreign Application Priority Data

Aug. 15, 2002 (JP) .............................. 2002-237020

(51) Int. Cl.
*G02B 6/10* (2006.01)
*F21V 7/04* (2006.01)

(52) U.S. Cl. ...................... 385/146; 362/620

(58) Field of Classification Search ............... 362/600, 362/615, 617, 619, 620; 385/146
See application file for complete search history.

(56) References Cited

U.S. PATENT DOCUMENTS

| 6,259,854 | B1 * | 7/2001 | Shinji et al. ................ 385/146 |
| 6,502,947 | B1 * | 1/2003 | Matsumoto et al. ........ 362/626 |
| 6,652,109 | B1 * | 11/2003 | Nakamura ................... 362/600 |
| 6,746,130 | B1 * | 6/2004 | Ohkawa ..................... 362/617 |

FOREIGN PATENT DOCUMENTS

| JP | 2-84618 | 3/1990 |
| JP | 7-270624 | 10/1995 |
| JP | 10-48429 | 2/1998 |
| JP | 2001-210123 | 8/2001 |
| WO | 02/48608 | 6/2002 |

* cited by examiner

*Primary Examiner*—Sung Pak
*Assistant Examiner*—Daniel Petkovsek
(74) *Attorney, Agent, or Firm*—Morgan, Lewis & Bockius, LLP

(57) ABSTRACT

A light guide (4) for guiding light emitted from a primary light source (2), having a light incident face (41) which light emitted from the primary light source (2) enters and a light emitting face (43) from which the guided light is emitted. The light emitting face (43) is uneven surface having a large number of micro convex curved surface areas. The average slant angle θa is 0.3° to 30°. The ten-point average roughness Rz is 0.7 μm to 10 μm. A light deflector (6) composed of a prism sheet is disposed beside the light emitting face (43).

10 Claims, 6 Drawing Sheets

100 μm

100 μm

100 μm

SURFACE LIGHT SOURCE AND LIGHT GUIDE USED THEREFOR

The present application is a U.S. National Phase Application of International Application PCT/JP03/010372, filed on Aug. 15, 2003, which claims the benefit of Japanese Patent Application No. 2002-237020, filed in Japan on Aug. 15, 2002, all of which are herein incorporated by reference in their entirety.

TECHNICAL FIELD

The present invention relates to an edge light system planar light source device, particularly to a planar light source device intended to prevent occurrence of adhesion or sticking between a light incident face of a sheet-like light deflector disposed adjacent to a light emitting face of a light guide, and the light emitting face of the light guide. The planar light source device of the present invention is preferably applied, for example, to a backlight of a liquid crystal display device for use as a monitor of a portable notebook-size personal computer, or a display unit of liquid crystal television, video integrated type liquid crystal television or the like, or a backlight of a comparatively small-sized liquid crystal display device for use as a display panel of a portable electronic apparatus such as a cellular phone or an indicator of each of various apparatuses.

BACKGROUND ART

In recent years, liquid crystal display devices have been broadly used as monitors for portable notebook-size personal computers and the like, or as display units for liquid crystal television, video integrated liquid crystal television and the like, and further in other various fields. The liquid crystal display device basically comprises a backlight and a liquid crystal display element. As the backlight, an edge light system has been frequently used from a viewpoint of miniaturization of liquid crystal display device. The backlight has been heretofore broadly used in which at least one end face of a rectangular plate-shaped light guide is used as a light incident face, a linear or rod-like primary light source such as a straight tube type florescence lamp is disposed along the light incident face, and the light emitted from the primary light source is introduced into the light guide from the light incident face of the light guide, and emitted from a light emitting face that is one of two major surfaces of the light guide.

Moreover, in recent years, there have been demands for miniaturization as well as reduction of power consumption with respect to liquid crystal display devices having comparatively small screen dimensions, such as indicators for portable electronic apparatuses including a cellular phone, portable game machine and the like, or various electric or electronic apparatuses. Then, a light emitting diode (LED) which is a spot light source is used as the primary light source of the backlight for the reduction of the power consumption. As the backlight in which the LED is used as the primary light source, for example, as described in JP(A)-7-270624, a plurality of LEDs are one-dimensionally arranged along the light incident face of the light guide in order to exert a function similar to that of a backlight using a linear light source. When the primary light source with one-dimensional arrangement of a plurality of LEDs is used, a required light quantity, and uniformity of luminance distribution over the whole screen can be obtained.

Furthermore, in JP(B)-7-27137, a method has been proposed in which a light guide including a rough surface formed on a light emitting face, comprising micro concave/convex portions as a light emission control function structure, is used. A prism sheet having a surface on which a large number of elongated prisms are arranged/formed is disposed on the light emitting face of the light guide in such a manner that the elongated prism formed surface is disposed on a light guide side (i.e., the elongated prism formed surface constitutes a light incident surface), so that the power consumption of the backlight is suppressed, and distribution of the emitted light is narrowed in order to prevent luminance from being sacrificed to the utmost.

Additionally, in recent years, thinning of the light guide and further the prism sheet which is a light deflector has been advanced even in the backlight based on demands for lightening and thinning of various apparatuses such as a liquid crystal display device.

In this case, even when the light incident surface of the prism sheet is used as the elongated prism formed surface as described above, adhesion or sticking sometimes non-uniformly occurs between the light guide and prism sheet formed of a dielectric material such as a synthetic resin, by attractive forces therebetween, such as an electrostatic attractive force. There has been a problem that an apparent defect of the planar light source device is made, and a quality level thereof drops, when the sticking occurs.

In JP(A)-10-48429, it has been proposed that the light emitting face of the light guide be formed into a mat-finished surface having an arithmetic average roughness (Ra) of 0.02 to 0.25 μm in order to prevent the occurrence of the sticking between the light guide and the prism sheet in the planar light source device. However, the occurrence of the sticking can be prevented to a certain degree on the mat-finished surface, but this has not been sufficiently satisfactory yet. The mat-finished surface of the light guide only has a purpose of preventing the occurrence of the sticking, and a mat structure which is a light emission control function structure has not been considered.

DISCLOSURE OF THE INVENTION

An object of the present invention is to provide a planar light source device in which occurrence of sticking between a light guide and a sheet-like light deflector of the above-described planar light source device is prevented without impairing any light emission characteristic of the light guide, even when the sheet-like light deflector is thinned, and which is superior in luminance and uniformity thereof, and has a high quality level without any deterioration of an image display performance in a case where the device is used as a backlight of a liquid crystal display device.

Moreover, an object of the present invention is to provide a light guide for use in the planar light source device.

In order to attain the above object, according to the present invention, there is provided a plate-shaped light guide for a planar light source device, which guides light emitted from a primary light source, the light guide comprising: a light incident face which the light emitted from the primary light source enters and a light emitting face from which the guided light is emitted, wherein the light emitting face is a finely uneven surface, an average slant angle $\theta a$ of the finely uneven surface is in a range of 0.3° to 30°, and a ten-point average roughness Rz is in a range of 0.7 μm to 10 μm.

In an aspect of the present invention, a central-line average roughness Ra of the finely uneven surface is in a range of 0.08 μm to 1.5 μm. In an aspect of the present invention, the finely uneven surface includes a large number of micro convex curved surface areas. In an aspect of the present invention, the light guide has a rectangular plate shape, and the light incident face is formed corresponding to one edge of the rectangular plate-shaped light guide. In an aspect of the present invention, the light guide has a rectangular plate shape, and the light incident face is formed corresponding to one corner portion of the rectangular plate-shaped light guide.

In order to attain the above object, according to the present invention, there is also provided a planar light source device comprising: the above light guide for the planar light source device; the primary light source disposed adjacent to the light incident face of the light guide; and a sheet-shaped light deflection element disposed adjacent to the light emitting face of the light guide, the light deflection element comprising: a light incoming surface positioned facing the light emitting face of the light guide; and a light outgoing surface on the opposite side, a plurality of elongated prisms being juxtaposed and formed on the light incoming surface.

In an aspect of the present invention, each of the elongated prisms of the light deflection element linearly extends substantially in a direction parallel to an edge of the light guide facing the light incident face. In an aspect of the present invention, each of the elongated prisms of the light deflection element circularly extends substantially centering on a corner portion corresponding to the light incident face of the light guide.

In an aspect of the present invention, the primary light source is a linear light source extending in a direction substantially parallel to an edge corresponding to the light incident face of the light guide. In an aspect of the present invention, the primary light source is a spot light source disposed adjacent to a corner portion corresponding to the light incident face of the light guide.

BEST MODE FOR CARRYING OUT THE INVENTION

Embodiments of the present invention will be described hereinafter with reference to the drawings.

Figure 1:
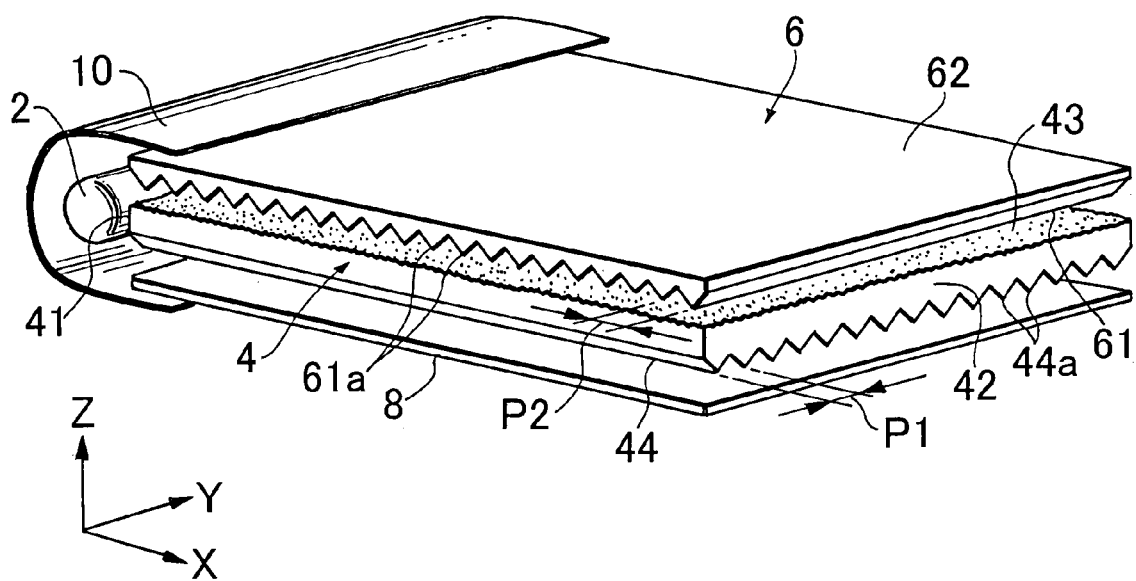
FIG. 1 is an exploded perspective view showing a planar light source device according to the present invention.

FIG. 1 is an exploded perspective view showing one embodiment of a planar light source device according to the present invention. As shown in FIG. 1, the planar light source device of the present embodiment comprises a linear primary light source 2 extending in a Y-direction, a plate-shaped light guide 4 which guides light emitted from the primary light source, a light deflector 6, and a light reflection element 8. The primary light source 2 is accompanied with a reflector 10.

The light guide 4 is disposed in parallel with an XY plane, and has a rectangular plate shape as a whole. The light guide 4 has four side edge faces, one of the side edge faces forming a pair substantially parallel to a YZ plane is used as a light incident face 41, and the primary light source 2 is disposed adjacent to the light incident face in such a manner as to face the edge face. The other side edge face 42 of the pair of side edge faces substantially parallel to the YZ plane of the light guide 4 may be used as a light incident face. In this case, a similar primary light source and reflector are disposed facing the side edge face 42 in the same manner as in the light incident face 41. Two major surfaces of the light guide 4 substantially crossing the light incident face at right angles are disposed substantially crossing a Z-direction at right angles, and an upper surface which is one major surface is used as a light emitting face 43. The light emitting face 43 comprises micro concave/convex portions constituting a light emission control function structure. Details of the surface (mat-finished surface, etc.) comprising the micro concave/convex portions will be described later. From the light emitting face 43, light is emitted having directivity in a distribution in an XZ plane including both a normal-line direction (Z-direction) of the light emitting face 43 and an X-direction crossing the light incident face 41 at right angles. An angle formed by a direction of a peak of the emitted light distribution with the light emitting face is, for example, 10° to 40°, and a full width at half maximum of the emitted light distribution is, for example, 10° to 40°.

On a major surface (back surface) 44 on the side opposite to the light emitting face 43 of the light guide 4, a large number of elongated lenses 44a extending in parallel with one another are formed in a direction (X-direction) substantially vertical to the light incident face 41 in order to control directivity of the emitted light from the light emitting face 43 in a plane (e.g., YZ plane) parallel to an extending direction of the primary light source 2. As the elongated lenses 44a, elongated prisms, elongated lenticular lenses, V-shaped grooves and the like are usable, and elongated prisms having substantially triangular YZ-sectional shapes are preferably used. An apex angle of the elongated prism is preferably in a range of 70° to 80° or 100° to 150°. When the prism apex angle is set to this range, the emitted light from the light emitting face 43 can be sufficiently condensed, and luminance of the planar light source device can be further enhanced. That is, when the prism apex angle is set to this range, it is possible to emit the condensed emitted light whose full width at half maximum of the emitted light distribution is 30° to 65° in a plane including peak light in the emitted light distribution and extending vertically to an XZ plane, and therefore the luminance of the planar light source device can be enhanced. An arrangement pitch P1 of the elongated lenses 44a is, for example, 10 μm to 100 μm, preferably 10 μm to 80 μm, more preferably 20 μm to 70 μm.

It is to be noted that the elongated lenses 44a may not be formed on the light guide back surface 44 in a case where there is not much demand for enhancement of the directivity of the light guide emitted light in the YZ plane.

It is to be noted that as the light emitting function structure of the light guide 4, a structure formed by mixing and dispersing light diffusing particulates inside the light guide 4 is usable together with a structure comprising a finely uneven surface formed on the light emitting face 43 as described above. As the light guide 4, in addition to the plate-shaped light guide having a uniform thickness (thickness in a case where a micro shape of the finely uneven surface of the light emitting face 43 and the elongated prism shape of the back surface 44 are ignored) as a whole as shown in FIG. 1, light guides having various sectional shapes are usable such as a wedge-shaped guide whose thickness gradually decreases toward the side edge face 42 from the light incident face 41 with respect to an X-direction, and a boat-shaped light guide whose thickness gradually decreases toward a light guide middle portion from both the light incident face 41 and the side edge face 42 with respect to the X-direction in a case where the primary light source is further disposed facing the side edge face 42.

The light deflector 6 is disposed on the light emitting face 43 of the light guide 4. Each of two major surfaces of the light deflector 6 is positioned substantially in parallel with an XY plane as a whole. One (major surface positioned facing the light emitting face 43 of the light guide) of two major surfaces is used as a light incoming surface 61, and the other surface is a light outgoing surface 62. The light outgoing surface 62 is a flat surface or a rough surface parallel to the light emitting face 43 of the light guide 4. The light incoming surface 61 is an elongated prism formed surface on which a large number of elongated prisms 61a are arranged in parallel with one another.

The elongated prisms 61a of the light incoming surface 61 extend in a Y-direction substantially parallel to the direction of the primary light source 2, and are formed in parallel with one another. An arrangement pitch P2 of the elongated prisms 61a is set to a range of preferably 10 µm to 100 µm, more preferably 10 µm to 80 µm, further preferably 20 µm to 70 µm. An apex angle of the elongated prisms 61a is set to a range of preferably 30° to 80°, more preferably 40° to 70°.

The thickness of the light deflector 6 is, for example, 30 to 350 µm.

Figure 2:
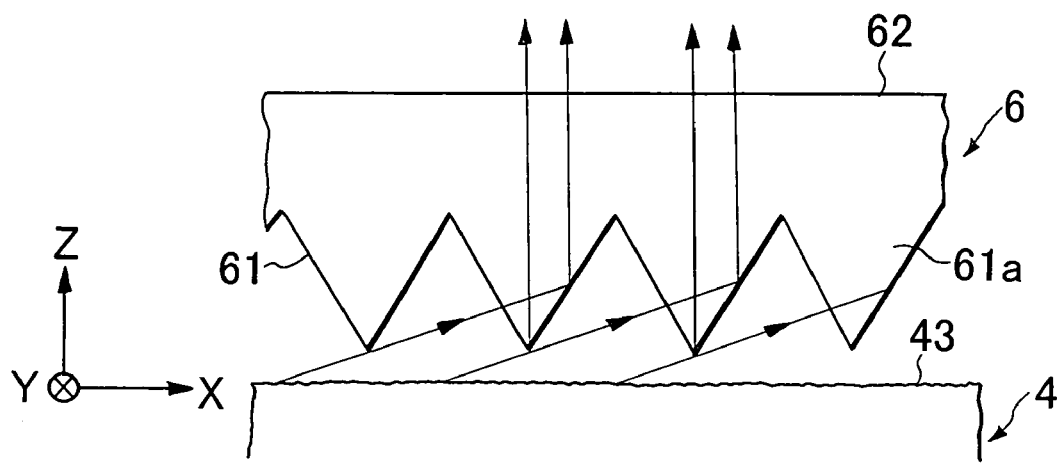
FIG. 2 is a diagram showing a state of light deflection by a light deflector.

FIG. 2 shows a state of light deflection by the light deflector 6. This drawing shows a travel direction of peak emitted light (light corresponding to peak of the emitted light distribution) from the light guide 4 in the XZ plane. The light obliquely emitted from the light emitting face 43 of the light guide 4 enters a first face of the elongated prism 61a, and is totally reflected by a second face thereof. While directivity of the emitted light from the light guide 4 is substantially maintained, the light is emitted substantially in a normal-line direction of the light outgoing surface 62. Consequently, high luminance can be obtained in the normal-line direction of the light outgoing surface 62 in the XZ plane.

The light deflector 6 performs a function of deflecting (changing an angle of) the emitted light from the light guide 4 in a target direction. In case of combination with the light guide 4 which emits the above-described light having high directivity, a lens sheet having a lens face on whose at least one surface a large number of lens units are juxtaposed and formed is preferably used. Various lens shapes formed on the lens sheet are used in accordance with purposes, and examples thereof include a prism shape, lenticular lens shape, fly eye lens shape, waveform shape and the like. Above all a prism sheet on which a large number of elongated prisms having substantially triangular sectional shapes are juxtaposed and arranged is especially preferable.

The light guide 4 and the light deflector 6 may comprise synthetic resins having high light transmittances. Examples of the synthetic resins include a methacrylic resin, acrylic resin, polycarbonate-based resin, polyester-based resin, vinyl chloride based resin, and cyclic polyolefin resin. Especially, the methacrylic resin has high light transmittance, and superior heat resistance, mechanical property, and forming/working property, and is optimum. As the methacrylic resin, a resin mainly composed of methyl methacrylate and containing 80 weight % or more methyl methacrylate is preferable. When a surface structure of the rough surface or a surface structure of the elongated prism or the like of the light guide 4 or light deflector 6 is formed, the structure may be formed by thermally pressing a transparent synthetic resin plate using a die member having a desired surface structure, or the shape may be formed simultaneously with molding by screen printing, extrusion, injection or the like. The structure surface may be formed using a thermal or photo setting resin or the like. Furthermore, a rough surface structure or an elongated lens arrangement structure formed of an active energy ray setting resin may be formed on the surface of a transparent substrate of a transparent film or sheet formed of a polyester-based resin, acrylic resin, polycarbonate-based resin, vinyl chloride based resin, polymethacrylic imide based resin or the like, or the sheet may be bonded/integrated onto/with a separate transparent substrate by methods such as bonding and fusion-bonding. As the active energy ray setting resin, a multifunctional (meth)acrylic compound, vinyl compound, (meth)acrylic ester, aryl compound, (meth)acrylic metal salt or the like is usable.

As the light reflection element 8, for example, a plastic sheet having a metal evaporated reflective layer on the surface thereof is usable. In the present invention, as the light reflection element 8, instead of the reflective sheet, a light reflective layer or the like formed on the back surface 44 of the light guide 4 by metal evaporation may be used. It is to be noted that a reflective member is preferably applied to an end face other than the end face utilized as the light incident face of the light guide 4.

The reflector 10 for guiding the light emitted from the primary light source 2 into the light incident face 41 of the light guide 4 with little loss is attached to the primary light source 2. As the reflector 10, for example, a plastic film having a metal evaporated reflective layer on the surface thereof is usable. As shown, the reflector 10 is wound to a light outgoing surface edge portion of the light deflector 6 from an edge portion outer surface of the light reflection element 8 via the outer surface of the primary light source 1. As another method, the light source reflector 10 may be wound to the light emitting face edge portion of the light guide 4 from the edge portion outer surface of the light reflection element 8 via the outer surface of the primary light source 2 avoiding the light deflector 6.

Additionally, in the present embodiment, in the finely uneven surface of the light emitting face 43 of the light guide 4, an average slant angle θa by ISO4287/1-1984 is preferably set to a range of 0.3° to 30° in order to achieve enhancement of luminance based on the directive light emission and enhancement of a uniformity of luminance in the light emitting face 43. The average slant angle θa is in a range of more preferably 0.4° to 28°, further preferably 0.5° to 23°. An optimum range of the average slant angle θa is preferably set in accordance with a ratio (L/t) of a length (L) in a direction in which the incident light propagates in the light guide relative to a thickness (t) of the light guide. That is, when the light guide having L/t of about 50 to 250 is used, the average slant angle θa is set to a range of preferably 0.3 to 10°, further preferably 0.4° to 8°, more preferably 0.5° to 5°. When the light guide 3 having L/t of about 50 or less is used, an average slant angle θa is set to a range of preferably 1° to 30°, more preferably 2° to 28°, further preferably 3° to 23°.

Moreover, in the finely uneven surface of the light emitting face 43 of the light guide 4, ten-point average roughness Rz is in a range of 0.7 μm to 10 μm, more preferably 0.75 μm to 8 μm, further preferably 0.8 μm to 5 μm. When the ten-point average roughness Rz is set in this range, sticking between the light guide 4 and the light deflector 6 can be prevented and there can be provided a planar light source device having high quality level without impairing the light emission control function of the finely uneven surface as the light emission control function structure, that is, while satisfactorily maintaining luminance and uniformity thereof. When the ten-point average roughness Rz is less than 0.7 μm, an effect of preventing the sticking between the light guide 4 and the light deflector 6 tends to drop, and the quality level of the planar light source device tends to be impaired. When the ten-point average roughness Rz exceeds 10 μm, an appropriate light emission control function by micro concave/convex portions is impaired, and the uniformity of luminance tends to drop. Moreover, the micro concave/convex portions form luminescent spots, and the quality level of the planar light source device tends to drop by glare or the like.

Moreover, in the finely uneven surface of the light emitting face 43 of the light guide 4, a central-line average roughness Ra is in a range of preferably 0.08 μm to 1.5 μm, more preferably 0.09 μm to 1.2 μm, further preferably 0.1 μm to 0.9 μm. When the central-line average roughness Ra is set to 0.08 μm or more, the sticking between the light guide 4 and the light deflector 6 can be prevented more effectively, and there can be provided a planar light source device having a high quality level. When the central-line average roughness Ra is set to 1.5 μm or less, the light emission control function by the micro concave/convex portions can be maintained, and there can be provided a planar light source device having more satisfactory luminance and uniformity thereof.

The finely uneven surface of the light emitting face 43 of the light guide 4 includes a large number of micro convex curved surface areas. The present inventor has found that sizes and distributed state of the micro convex curved surface areas are closely related to occurrence of the sticking with respect to the areas formed on conditions that the directivity of the emitted light from the light emitting face 43 is maintained and that optical characteristics such as high luminance and satisfactory uniformity of the luminance are maintained. That is, when the micro convex curved surface areas having smaller dimensions are densely distributed, the finely uneven surface has a surface property close to that of a flat surface, and the sticking easily occurs. When the micro convex curved surface areas having smaller dimensions are coarsely distributed, a required average slant angle is not obtained, and the directivity of the emitted light easily drops. On the other hand, in the micro convex curved surface areas having larger dimensions, the luminescent spots are visible, and an optical performance easily drops. Therefore, when the size of the convex curved surface area is set to be appropriate, a distributed state thereof is controlled to be appropriate, a required average slant angle is maintained, the distribution of the micro convex curved surface areas is set to be slightly coarse, and an appropriate concave area (flat area) is formed between adjacent micro convex curved surface areas, the sticking can be effectively prevented.

Optimum ranges of the size and distributed state of the convex curved surface area can be obtained by combination of the ten-point average roughness Rz and the central-line average roughness Ra. That is, the central-line average roughness Ra refers to averaged roughness including the concave area (flat area) locating between the adjacent micro convex curved surface areas, and the ten-point average roughness Rz indicates the roughness of the only convex curved surface area that does not include any concave area (flat area) locating between the adjacent micro convex curved surface areas. Therefore, when the combination is set to the above-described range, the sticking can be effectively prevented.

As to the average slant angle θa of the finely uneven surface which is the light emitting function structure formed on the light emitting face 43 of the light guide 4, according to ISO4287/1-1984, a rough surface shape is measured using a probe system surface roughness gauge, coordinate in a measurement direction is assumed as x, and the average slant angle can be obtained from an obtained inclination function f(x) using the following equations (1) and (2). Here, L denotes a measurement length, and Δa is tangent of the average slant angle θa:

$$\Delta a = (1/L) \int_0^L |(d/dx)f(x)| dx \qquad (1); \text{ and}$$

$$\theta_a = \tan^{-1}(\Delta a) \qquad (2).$$

Furthermore, light emission ratio of the light guide 4 is in a range of preferably 0.5% to 5%, more preferably 1% to 3%. When the light emission ratio is smaller than 0.5%, a quantity of light emitted from the light guide 4 is reduced, and there is a tendency that sufficient luminance is not obtained. When the light emission ratio is larger than 5%, a large quantity of light is emitted in the vicinity of the primary light source 2, attenuation of the light in a Y-direction in the light emitting face 43 is remarkable, and there is a tendency that the uniformity of luminance in the light emitting face 43 drops. When the light emission ratio of the light guide 4 is set to 0.5% to 5% in this manner, light having an emission characteristic that the directivity is high can be emitted from the light guide 4. An angle of the peak light emitted from the light emitting face is in a range of 50° to 80° with respect to the normal line of the light emitting face, and the full width at half maximum of the emitted light distribution in a plane including the X-direction and extending vertically to the light emitting face 43 is 10° to 40°. The emission direction can be efficiently deflected by the light deflector 6, and there can be provided a planar light source device having a high luminance.

The light emission ratio of the light guide 4 is defined as follows. A light intensity ($I_0$) of the emitted light on the side of the light incident face 41 of the light emitting face 43, and emitted light intensity (I) in a position at a distance L from the edge face satisfies a relation of the following equation (3), assuming that the thickness (Z-direction dimension) of the light guide 4 is t:

$$I = I_0 \cdot \alpha (1-\alpha)^{L/t} \qquad (3),$$

where constant α is a light emission ratio, i.e. a ratio (%) at which the light goes out of the light guide 4 per unit length (length corresponding to the light guide thickness t) in a Y-direction in the light emitting face 43. When a logarithm of the light intensity of the emitted light from the light emitting face 43 is indicated on the ordinate, (L/t) is indicated on the abscissa, and the relation is plotted, the light emission ratio α can be obtained from gradient.

It is to be noted that the light emitting function structure of the light guide can be disposed in such a manner that the emission ratio has a non-uniform distribution in the light emitting face 43 of the light guide 4. For example, a surface roughening treatment is performed in such a manner that the distribution of the surface roughness of the finely uneven surface which is the light emitting function structure in the light emitting face 43 is non-uniform, and consequently the non-uniform distribution of the emission ratio can be formed.

A liquid crystal display element is disposed on the light emission surface (light outgoing surface 62 of the light deflector 6) of the planar light source device constituted of the above-described primary light source 2, light guide 4, light deflector 6, and light reflection element 8, and accordingly a liquid crystal display device is constituted. The liquid crystal display device is observed by an observer through the liquid crystal display element from above in FIG. 1. Since sufficiently collimated light having a narrow distribution can be applied into the liquid crystal display element from the planar light source device, satisfactory image display having uniformity in brightness and hue without any gradation reverse is obtained in the liquid crystal display element. Moreover, light irradiation concentrated in a desired direction is obtained, and use efficiency of the emitted light quantity of the primary light source with respect to illumination in this direction can be enhanced.

Furthermore, a light diffusion element may be disposed adjacent to the light outgoing surface 62 of the light deflector 6. By this light diffusion element, glare, luminance unevenness and the like causing a drop of quality level of image display are suppressed, and the quality level of the image display can be enhanced. The light diffusion element may be formed into a sheet to which a light diffusing material is added. The light diffusion element may be bonded to or integrated with the light deflector 6 on the side of the light outgoing surface 62 thereof, or may be laid on the light deflector 6. When the light diffusion element is laid on the light deflector 6, a concave/convex structure is preferably formed on the face (face on a light incident side) of the light diffusion element facing the light deflector 6 in order to prevent the sticking to the light deflector 6. Furthermore, it is preferable to form the concave/convex structure also on the surface of the light diffusion element on the light emission side in order to prevent the sticking to the liquid crystal display element disposed on the surface of the light diffusion element. This concave/convex structure can be constituted in such a manner that an average slant angle is preferably 0.7° or more, further preferably 1.0° or more, more preferably 1.5° or more.

Figure 3:
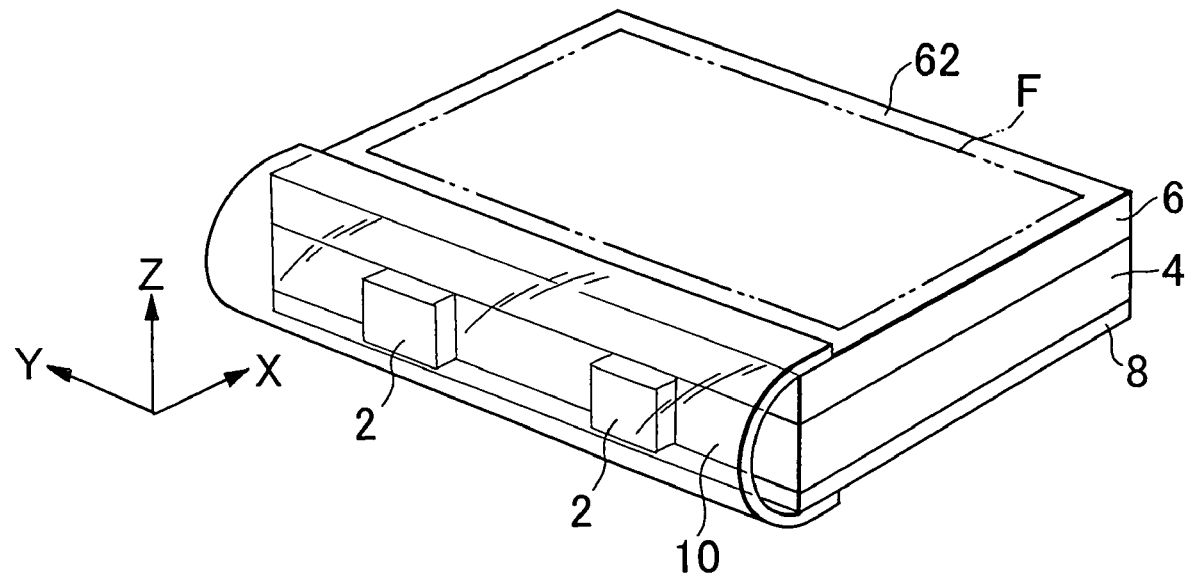
FIG. 3 is a perspective view showing the planar light source device according to the present invention.

FIG. 3 is a perspective view showing another embodiment of the planar light source device according to the present invention. In this drawing, members, portions and the like having functions similar to those in FIGS. 1 and 2 are denoted with the same reference numerals.

In the present embodiment, a plurality of LEDs which are substantially spot light sources are used as a primary light source 2. In FIG. 3, symbol F indicates an effective light emission region of the light emission surface of the planar light source device, which corresponds to an effective display region of the liquid crystal display element combined and used with the planar light source device. In the present embodiment, a reflector 10 is disposed in such a manner as to cover the end-face portion of the laminate of a light deflector 6, light guide 4, and light reflection element 8 in a region other than the effective light emission region F, and the LEDs 2. Consequently, the light emitted from the end-face portion of the laminate, and light leaking from a case of the LEDs 2 are satisfactorily diffused and reflected in an XY plane, and can be applied into the light guide 4 again. Therefore, the light having desired intensity can be guided into a broad region of the light guide light emitting face 43, and this can contribute to enhancement of uniformity of luminance.

Figure 4:
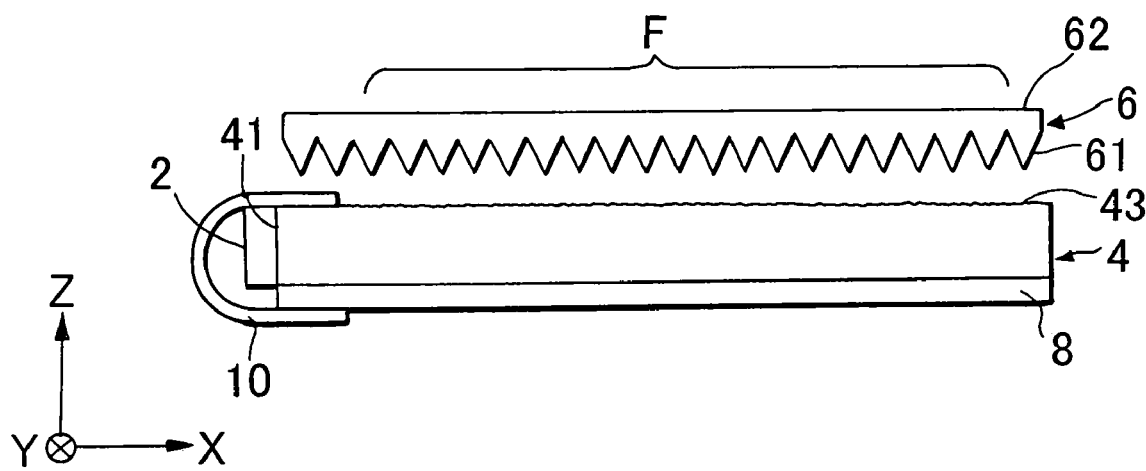
FIG. 4 is a side view showing the planar light source device according to the present invention.

FIG. 4 is a side view showing still another embodiment of the planar light source device according to the present invention. In FIG. 4, members, portions and the like having functions similar to those in FIGS. 1 to 3 are denoted with the same reference numerals.

In the present embodiment, a reflective sheet 10 having a light diffusing property is attached in such a manner as to cover the end-face portion of the laminate of a light guide 4 and light reflection element 8 in a region other than an effective light emission region F, and LEDs 2. A light deflector 6 is disposed on the laminate. Consequently, a function/effect similar to that of the embodiment of FIG. 3 can be obtained. Additionally, in this embodiment, as compared with the embodiment of FIG. 3, a function of diffusion in an XY plane is low, but high luminance can be obtained.

In the above-described embodiments, a plurality of spot primary light sources such as LEDs are used. In this case, a plurality of spot light sources are preferably arranged in such a manner that directions of maximum intensity beams of light emitted from the light sources are parallel to one another.

Figure 5:
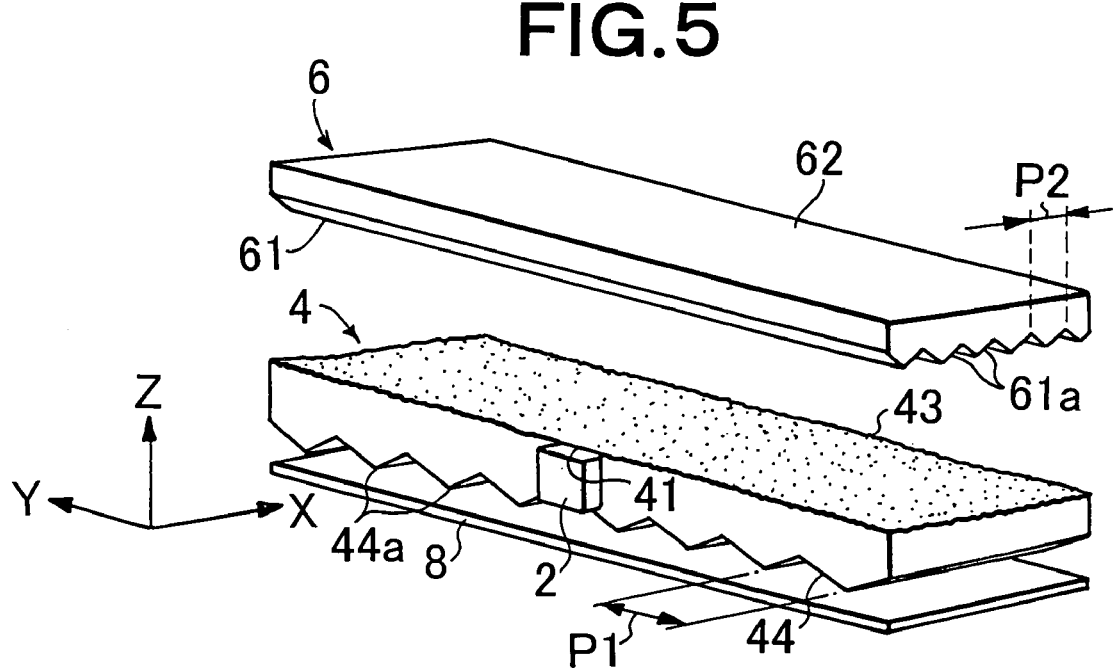
FIG. 5 is an exploded perspective view showing the planar light source device according to the present invention.

FIG. 5 is an exploded perspective view showing one embodiment of the planar light source device according to the present invention. In FIG. 5, members, portions and the like having functions similar to those in FIGS. 1 to 4 are denoted with the same reference numerals.

The planar light source device of the present embodiment has a constitution similar to that of the above-described embodiment except that one LED is used as a spot primary light source 2. That is, the planar light source device of the present embodiment comprises: an LED which is the spot primary light source 2; a rectangular-plate-shaped light guide 4 in an XY plane, which allows light emitted from the LED to enter therein through a light incident end face and which guides therein and emits the light from a light emitting face; and a light deflector 6 and a light reflection element 8 disposed adjacent to the light guide. The light guide 4 has upper and lower major surfaces, and four edges connecting outer peripheral edges of the major surfaces to one another.

The primary light source 2 is disposed adjacent to one (front-side edge of FIG. 5: incident side edge) of a pair of edges of the light guide 4 substantially parallel to each other, and in a middle position in a Y-direction. The number of spot light sources such as LEDs which are primary light sources is preferably as small as possible from a viewpoint of reduction of power consumption. A plurality of light sources may be used depending on the size of the light guide 4 as in the above-described embodiment of FIG. 3. In this case, the light sources may be disposed at equal intervals or close to one another.

A light incident face 41 corresponding to a position in which the primary light source 2 is disposed is formed on a light incident side edge of the light guide 4. The light incident face 41 formed on the light guide 4 may be formed by cutting the light incident side edge in a concave shape in such a manner as to form a concave cylindrical surface shape. The LED light emitting face and the light incident face preferably have concave/convex reversed shapes fitted in each other (including a case where both the faces are flat faces).

One major surface (upper surface in the drawing) of the light guide 4 is formed as a light emitting face 43. The light emitting face 43 has micro concave/convex portions which function as a directive light emitting function structure for emitting the light guided in the light guide 4 in a direction (i.e., direction inclined with respect to an XY plane) inclined with respect to the light emitting face 43. The directive light emitting function structure comprising a finely uneven surface emits light having directivity in a distribution in an XZ plane including both a normal-line direction (Z-direction) of the light emitting face 43 and an X-direction crossing the light incident side edge at right angles. An angle formed by a peak direction of the emitted light distribution with the light emitting face 43 is, for example, 10 to 40°, and a half width of the emitted light distribution is, for example, 10 to 40°.

The other major surface (lower surface in the drawing: back surface) 44 of the light guide 4 is formed as an elongated lens formed surface. The elongated lens formed surface has elongated lenses 44a extending substantially along a direction (direction of light having maximum intensity in light intensity distribution) of directivity of light emitted from the primary light source 2 and applied into the light guide 4 and arranged in parallel with one another. For example, when the direction of the directivity of the light applied into the light guide 4 is substantially an X-direction, the direction of the elongated lens 44a can be set to the X-direction.

In the light deflector 6, elongated prisms 61a of a light incoming surface 61 extend in a direction substantially crossing the direction of the directivity of the light applied into the light guide 4 from the primary light source 2 at right angle, and are arranged in parallel with one another. In the present embodiment, the elongated prism 61a extends in a Y-direction.

Also in the present embodiment, a function/effect similar to that of the above-described embodiment can be obtained.

Figure 6:
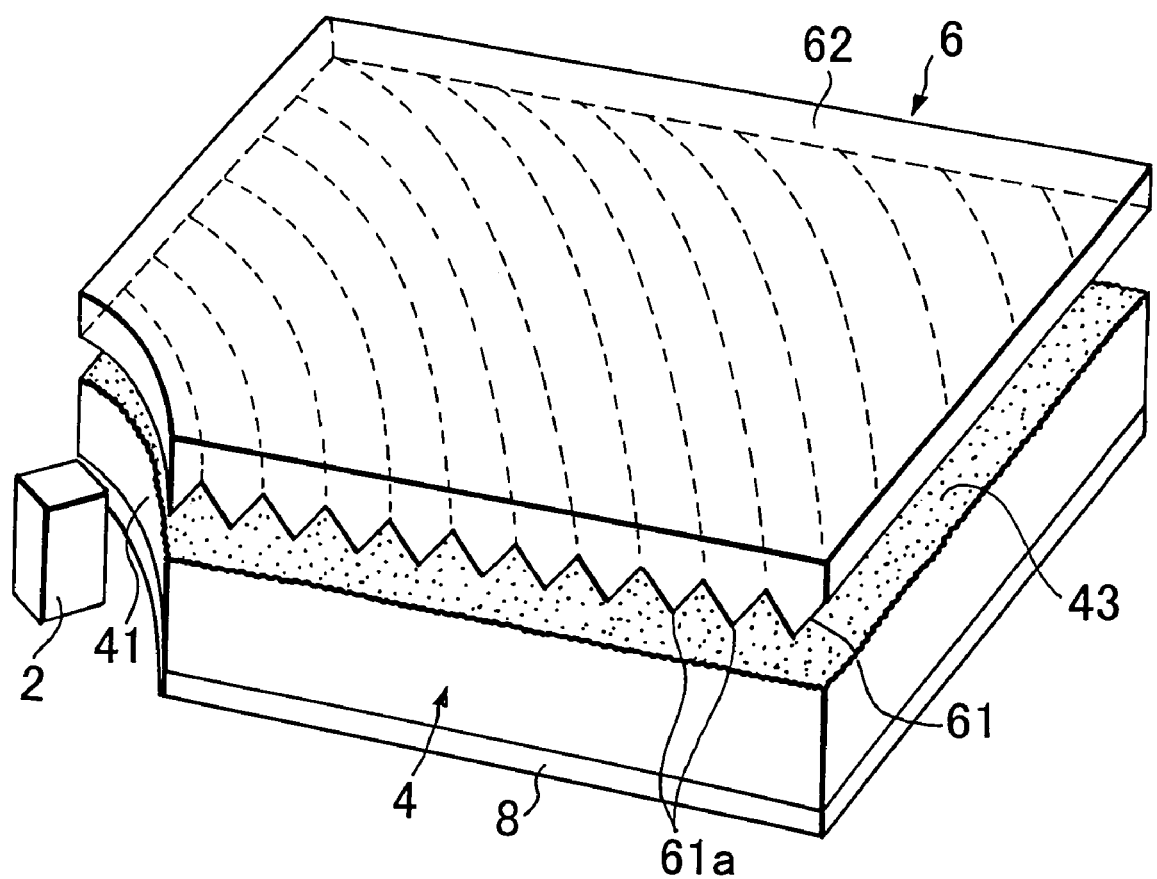
FIG. 6 is an exploded perspective view showing the planar light source device according to the present invention.

FIG. 6 is an exploded perspective view showing one embodiment of the planar light source device according to the present invention. In FIG. 6, members, portions and the like having functions similar to those in FIGS. 1 to 5 are denoted with the same reference numerals.

In the present embodiment, an LED which is a spot primary light source 2 is disposed adjacent to a light incident face 41 formed on a cutout portion of a corner portion of a light guide 4. Moreover, maximum intensity light emitted from the primary light source 2 travels in parallel with a diagonal line connecting a corner portion on which the cutout portion of the light guide 4 is formed to a corner portion in a diagonal position. A light guide back surface 44 is formed into a flat surface.

It is to be noted that in the present embodiment, an elongated prism 61a of a light incoming surface 61 of a light deflector 6 is not linear, and is circular arc surrounding the primary light source 2 substantially centering on the primary light source.

Also in the present embodiment, a function/effect similar to that of the above-described embodiment can be obtained.

Examples of the present invention and a comparative example will be described hereinafter.

It is to be noted that in the examples and comparative example, an average slant angle θa, central-line average roughness Ra, and ten-point average roughness Rz were measured as follows. That is, surface roughness was measured at a driving speed of 0.03 mm/second with a probe type surface roughness gauge (Surfcom 570A manufactured by Tokyo Seiki Co., Ltd.) using 1 μmR, 55° conical diamond needle (010-2528) as a probe. A measurement length was set to 2 mm. After correcting the inclination of an average line of an extracted curve, values of the central-line average roughness Ra and ten-point average roughness Rz were obtained, and further a central-line average value of a curve obtained by differentiating the extracted curve was obtained according to the above-described equations (1) and (2) to thereby obtain a value of the average slant angle θa.

As to a uniformity of the planar light source device, luminance was measured every position at an interval of 1 mm along a length direction in a region which is 4 mm to 4.5 mm from the edge of the light emitting face of the planar light source device on the light incident face side which has a width of 0.5 mm, and a ratio (minimum value/maximum value) of a minimum value of the measured luminance value to the maximum value thereof was obtained.

As to the luminance of the planar light source device, a cold cathode tube was used as a primary light source, DC12V was applied to an inverter (HIU-742A manufactured by Harrison Co.), and the tube was lit at high frequency, the surface of the planar light source device was divided into 3×5 square portions each having four 20 mm sides, and a 15-point average of the luminance value in the normal-line direction of each square portion was obtained.

EXAMPLE 1

The surface of a stainless steel plate finished into a mirror surface was roughened using glass beads (J220 manufactured by Potters Varotine Co.). A distance from the stainless steel plate to a blowing nozzle was set to 35 cm, and the whole surface was subjected to a blast treatment at a blowing pressure of 0.10 MPa. Accordingly, a first mold having a shape transfer face of the rough surface was obtained.

On the other hand, another stainless steel plate was finished into the mirror surface, and a second mold having a shape transfer face of a flat surface was obtained.

Figure 7:
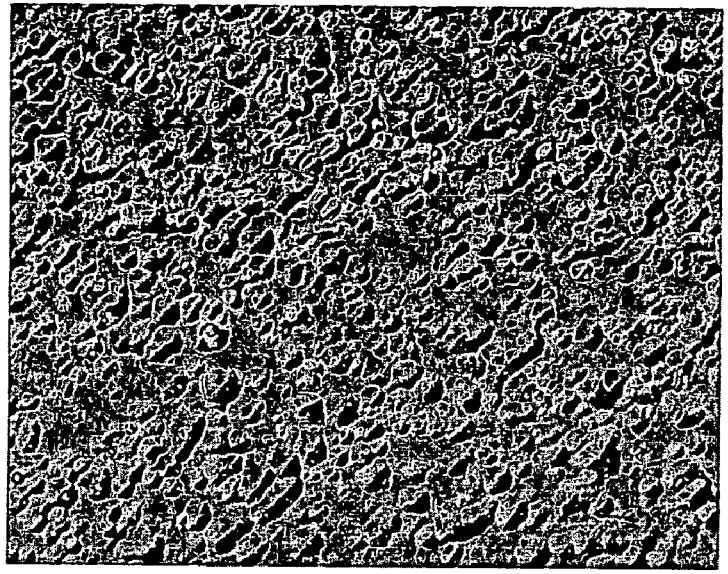
FIG. 7 is a surface shape diagram of a mat-finished surface of a light guide obtained in an example based on a microscope photographed image.

Injection molding was performed using the first and second molds, and a transparent acrylic resin plate was prepared as a light guide. The plate had a rectangular shape having a length of a long side of 290 mm and a length of a short side of 216 mm, and a wedge shape whose thickness changed to 0.7 mm from 2.0 mm along the short side. One surface (light emitting face) comprised a mat-finished surface, and the other surface (back surface) comprised a flat surface. As to the surface shape of the mat-finished surface of the obtained light guide, as shown in FIG. 7, an average slant angle θa was 1.1°, a central-line average roughness Ra was 0.12 μm, and a ten-point average roughness Rz was 0.90 μm.

A cold cathode tube was disposed along a long side of the light guide in such a manner as to face the long-side end face having a thickness of 2.0 mm, and a light source reflector was disposed in such a manner as to cover a portion other than a portion of the cold cathode tube facing the light incident face of light guide. A light diffusion reflective sheet (E60 manufactured by Toray Industries, Inc.) was disposed as a light reflection element on the back surface of the light guide. On the light emitting face, a prism sheet (M165 manufactured by Mitsubishi Rayon Co., Ltd.) on which a large number of elongated prisms having an apex angle of 65° were juxtaposed at a pitch of 50 µm and formed as a light deflector was disposed facing the elongated prism formed surface, to thereby obtained the planar light source device (additionally, any elongated prism was not formed on the back surface of the light guide) shown in FIG. 1. That is, the surface comprising the mat-finished surface of the light guide was used as a light emitting face.

Electricity removing blowing was performed during assembling for preparation of the above-described planar light source device. When the light emission surface of the obtained planar light source device was observed, any unevenness of a distance between the light guide and the prism sheet, or optical unevenness attributable to optical abnormality by optical adhesion or the like was not observed. In the planar light source device, an average luminance was 155 cd/m², uniformity ratio was 0.75, and both were satisfactory.

Moreover, when observing the light emission surface of the planar light source device obtained in the same manner except that the electricity removing blowing was not performed during the assembling for the preparation of the planar light source device, any unevenness of the distance between the light guide and the prism sheet, or optical unevenness attributable to optical abnormality by optical adhesion or the like was not observed.

EXAMPLE 2

Figure 8:
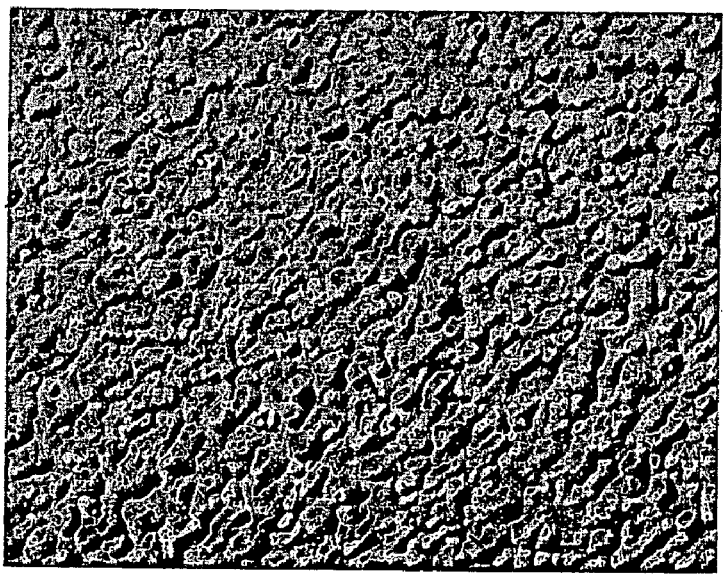
FIG. 8 is a surface shape diagram of the mat-finished surface of the light guide obtained in an example based on the microscope photographed image.

The same steps as those of Example 1 were performed except that a blowing pressure during a blast treatment was set to 0.08 MPa. As to a surface shape of a mat-finished surface, as shown in FIG. 8, an average slant angle θa was 1.1°, a central-line average roughness Ra was 0.09 µm, and a ten-point average roughness Rz was 0.75 µm.

When observing a light emission face of a planar light source device obtained by performing electricity removing blowing during assembling for preparation of the planar light source device, any unevenness of a distance between the light guide and a prism sheet, or optical unevenness attributable to optical abnormality by optical adhesion or the like was not observed. In the planar light source device, an average luminance was 152 cd/m², uniformity ratio was 0.79, and both were satisfactory.

Moreover, when observing the light emitting face of the planar light source device obtained in the same manner except that the electricity removing blowing was not performed during the assembling for the preparation of the planar light source device, unevenness of the distance between the light guide and the prism sheet, or optical unevenness attributable to optical abnormality by optical adhesion or the like was slightly observed.

COMPARATIVE EXAMPLE 1

Figure 9:
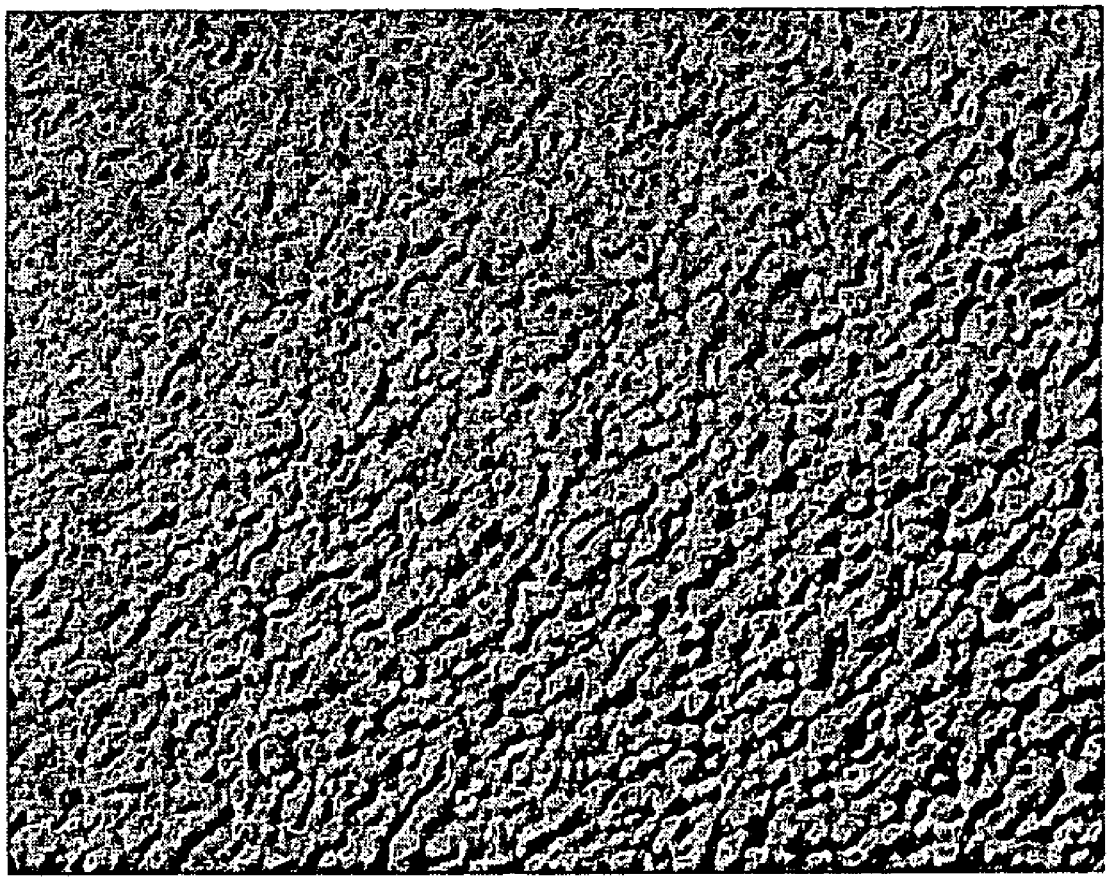
FIG. 9 is a surface shape diagram of the mat-finished surface of the light guide obtained in an example based on the microscope photographed image.

The same steps as those of Example 1 were performed except that J400 manufactured by Potters Varotine Co. was used as glass beads for a blast treatment, and a blowing pressure during the blast treatment was set to 0.15 MPa. A surface shape of a mat-finished surface of an obtained light guide is as shown in FIG. 9. An average slant angle θa was 1.1°, a central-line average roughness Ra was 0.07 µm, and a ten-point average roughness Rz was 0.61 µm.

When observing a light emission surface of a planar light source device obtained by performing electricity removing blowing during assembling for preparation of the planar light source device, unevenness of a distance between the light guide and a prism sheet, or optical unevenness attributable to optical abnormality by optical adhesion or the like was partially observed. In the planar light source device, an average luminance was 153 cd/m², and uniformity ratio was 0.77.

Moreover, when observing the light emission surface of the planar light source device obtained in the same manner except that the electricity removing blowing was not performed during the assembling for the preparation of the planar light source device, the unevenness of the distance between the light guide and the prism sheet, or the optical unevenness attributable to the optical abnormality by the optical adhesion or the like was observed over the whole surface.

INDUSTRIAL APPLICABILITY

As described above, according to the present invention, by use of a light guide having a light emitting face comprising a finely uneven surface in which an average slant angle θa and a ten-point average roughness Rz are in specific ranges, there can be provided a planar light source device without impairing a light emission control function of the finely uneven surface which is a light emission control function structure. Even when a sheet-shaped light deflector is thinned, occurrence of sticking between the light guide and the sheet-shaped light deflector can be prevented. When the device is used as a backlight of a liquid crystal display device, luminance and uniformity thereof are superior, and high quality level is achieved without any deterioration of image display performance.

The invention claimed is:

1. A plate-shaped light guide for a planar light source device, which guides light emitted from a primary light source, the light guide comprising: a light incident face which the light emitted from the primary light source enters and a light emitting face from which the guided light is emitted,
    wherein the light emitting face is a finely uneven surface,
        an average slant angle θa of the finely uneven surface is in a range of 0.3° to 30° with uniform distribution across a major part of the light emitting face, and a ten-point average roughness Rz is in a range of 0.7 µm to 10 µm with uniform distribution across the major part of the light emitting face.

2. The light guide for the planar light source device according to claim 1, wherein a central-line average roughness Ra of the finely uneven surface is in a range of 0.08 µm to 1.5 µm with uniform distribution across the major part of the light emitting face.

3. The light guide for the planar light source device according to claim 1, wherein the finely uneven surface includes a large number of micro convex curved surface areas.

4. The light guide for the planar light source device according to claim 1, wherein the light guide has a rectangular plate shape, and the light incident face is formed corresponding to one edge of the rectangular plate-shaped light guide.

5. The light guide for the planar light source device according to claim 1, wherein the light guide has a rectangular plate shape, and the light incident face is formed corresponding to one corner portion of the rectangular plate-shaped light guide.

6. A planar light source device comprising: the light guide for the planar light source device according to any one of claims 1 to 5; the primary light source disposed adjacent to the light incident face of the light guide; and a sheet-shaped light deflection element disposed adjacent to the light emitting face of the light guide, the light deflection element comprising: a light incoming surface positioned facing the light emitting face of the light guide; and a light outgoing surface on the opposite side, a plurality of elongated prisms being juxtaposed and formed on the light incoming surface.

7. The planar light source device according to claim 6, wherein each of the elongated prisms of the light deflection element linearly extends substantially in a direction parallel to an edge of the light guide facing the light incident face.

8. The planar light source device according to claim 6, wherein each of the elongated prisms of the light deflection element circularly extends substantially centering on a corner portion corresponding to the light incident face of the light guide.

9. The planar light source device according to claim 7, wherein the primary light source is a linear light source extending in a direction substantially parallel to an edge corresponding to the light incident face of the light guide.

10. The planar light source device according to claim 8, wherein the primary light source is a spotlight source disposed adjacent to a corner portion corresponding to the light incident face of the light guide.

* * * * *